United States Patent
Kloiber et al.

(10) Patent No.: US 9,341,521 B2
(45) Date of Patent: May 17, 2016

(54) COMPOSITE MATERIAL FOR TEMPERATURE MEASUREMENT, TEMPERATURE SENSOR COMPRISING THE COMPOSITE MATERIAL, AND METHOD FOR PRODUCING THE COMPOSITE MATERIAL AND THE TEMPERATURE SENSOR

(75) Inventors: Gerald Kloiber, Feldkirchen (AT); Heinz Strallhofer, Deutschlandsberg (AT)

(73) Assignee: EPCOS AG, Munich (DE)

( * ) Notice: Subject to any disclaimer, the term of this patent is extended or adjusted under 35 U.S.C. 154(b) by 574 days.

(21) Appl. No.: 12/918,286

(22) PCT Filed: Feb. 9, 2009

(86) PCT No.: PCT/DE2009/000174
§ 371 (c)(1),
(2), (4) Date: Nov. 17, 2010

(87) PCT Pub. No.: WO2009/103261
PCT Pub. Date: Aug. 27, 2009

(65) Prior Publication Data
US 2011/0051778 A1  Mar. 3, 2011

(30) Foreign Application Priority Data
Feb. 19, 2008  (DE) .................. 10 2008 009 817

(51) Int. Cl.
*G01K 7/16* (2006.01)
*G01K 7/22* (2006.01)
*H01C 7/02* (2006.01)
*H01C 7/04* (2006.01)

(52) U.S. Cl.
CPC ........ *G01K 7/223* (2013.01); *H01C 7/02* (2013.01); *H01C 7/04* (2013.01); *H01C 7/045* (2013.01); *Y10T 29/49002* (2015.01)

(58) Field of Classification Search
CPC ........................................................ G01K 7/16
USPC ........ 374/185, 178, 163, 100, 179; 338/22 R, 338/25, 28
See application file for complete search history.

(56) References Cited

U.S. PATENT DOCUMENTS 3,851,291 A * 11/1974 Sommer ................. 338/22 R
4,472,258 A *  9/1984 Secrist et al. ............ 204/292
4,957,718 A *  9/1990 Yoo et al. ............. 423/243.07
5,063,122 A * 11/1991 Rohr ........................ 429/456
5,134,248 A *  7/1992 Kiec et al. ............... 174/84 R (Continued)

FOREIGN PATENT DOCUMENTS

CN  1307342  8/2001
CN  1574117  2/2005

(Continued)

*Primary Examiner* — Gail Kaplan Verbitsky
(74) *Attorney, Agent, or Firm* — Cozen O'Connor

(57) ABSTRACT

A composite material 1 for temperature measurement is specified, as is a temperature sensor 10 formed from the composite material 1. Additionally specified are processes for producing the composite material 1 and for producing the temperature sensor 10.

11 Claims, 2 Drawing Sheets

(56) References Cited

U.S. PATENT DOCUMENTS

| | | | |
|---|---|---|---|
| 5,194,480 A * | 3/1993 | Block et al. | 524/404 |
| 5,330,849 A * | 7/1994 | Kennedy et al. | 428/552 |
| 5,568,116 A | 10/1996 | Iwaya et al. | |
| 5,858,902 A * | 1/1999 | Ishikawa et al. | 501/152 |
| 5,955,937 A * | 9/1999 | Groen | 338/22 SD |
| 5,976,421 A * | 11/1999 | Groen | 252/521.2 |
| 6,137,395 A * | 10/2000 | Kobayashi et al. | 338/32 R |
| 6,218,928 B1 * | 4/2001 | Okada et al. | 338/22 R |
| 6,245,439 B1 | 6/2001 | Yamada et al. | |
| 6,469,612 B2 * | 10/2002 | Nakayama et al. | 338/22 R |
| 6,524,697 B1 | 2/2003 | Furuyama et al. | |
| 6,623,881 B2 * | 9/2003 | Badding et al. | 429/482 |
| 7,001,538 B2 * | 2/2006 | Lee et al. | 252/511 |
| 7,286,038 B1 | 10/2007 | Wang et al. | |
| 7,341,679 B2 | 3/2008 | Handa | |
| 2002/0074657 A1 * | 6/2002 | Nakayama et al. | 257/747 |
| 2007/0151968 A1 * | 7/2007 | Yamashita et al. | 219/553 |
| 2007/0271782 A1 * | 11/2007 | Block et al. | 29/843 |
| 2008/0056331 A1 | 3/2008 | Matias | |
| 2010/0175992 A1 * | 7/2010 | Shah et al. | 204/403.14 |
| 2013/0049530 A1 * | 2/2013 | Koo et al. | 310/300 |

FOREIGN PATENT DOCUMENTS

| | | |
|---|---|---|
| DE | 695 23 732 | 8/1995 |
| DE | 199 52 127 | 5/2001 |
| DE | 198 21 239 | 1/2006 |
| DE | 10 2004 047 725 | 4/2006 |
| DE | 699 35 389 | 11/2007 |
| EP | 0 862 191 | 9/1997 |
| EP | 0 901 134 | 3/1999 |
| EP | 1 122 211 | 8/2001 |
| EP | 1122211 | 8/2001 |
| EP | 1 231 613 | 8/2002 |
| EP | 1 492 132 | 12/2004 |
| GB | 2352816 A * | 2/2001 |
| JP | 55-108106 | 8/1980 |
| JP | 59-123302 | 8/1984 |
| JP | 61158192 A * | 7/1986 |
| JP | 63-060502 | 3/1988 |
| JP | 09-232105 | 9/1997 |
| JP | 2000-512078 | 9/2000 |
| JP | 2001-052905 | 2/2001 |
| JP | 2007-096205 | 4/2007 |

\* cited by examiner

US 9,341,521 B2

COMPOSITE MATERIAL FOR TEMPERATURE MEASUREMENT, TEMPERATURE SENSOR COMPRISING THE COMPOSITE MATERIAL, AND METHOD FOR PRODUCING THE COMPOSITE MATERIAL AND THE TEMPERATURE SENSOR

RELATED APPLICATIONS

This is a U.S. national stage of application No. PCT/DE2009/000174, filed on Feb. 9, 2009.

This application claims the priority of German application no. 10 2008 009 817.5 filed Feb. 19, 2008, the entire content of which is hereby incorporated by reference.

The invention relates to a composite material for temperature measurement and to a process for producing the composite material. The invention further relates to a temperature sensor formed from the composite material, and to a process for producing the temperature sensor.

BACKGROUND OF THE INVENTION

Conventional temperature sensors which are used for temperature measurement on surfaces of components have a complicated structure and are laborious and costly to produce.

SUMMARY OF THE INVENTION

It is an object of the invention to provide a composite material for temperature measurement, and a temperature sensor formed from the composite material. It is a further object of the invention to provide simple and inexpensive processes for producing the composite material and for producing the temperature sensor.

In one embodiment, a composite material for temperature measurement comprises a ceramic filler and a formable matrix which embeds the filler. The ceramic filler has a positive or negative temperature coefficient of electrical resistance. The composite material additionally has a resistance-temperature characteristic determined by the ceramic filler. Thus, a composite material which has a resistance-temperature characteristic which has a negative temperature coefficient (NTC) or a positive temperature coefficient (PTC), and is at the same time a formable material, is provided. The composite material can be formed in any way and hence also processed to give surface-mountable elements, for example films. By virtue of the composite material having a temperature-dependent resistance characteristic, the composite material can be formed as a temperature sensor. The composite material may also have a good thermal conductivity.

The composite material may additionally have a material of the matrix selected from a group comprising glass-like materials, thermoplastics, thermosets, elastomers or mixtures thereof. The polymeric materials used may, for example, be polyphenylene sulfide (PPS) or polyamide (PA). These materials are readily formable and have the effect that the composite material has good processability.

The filler in the composite material may be present as a multitude of particles in the matrix. It is thus possible to mix a pulverulent ceramic filler material which has NTC or PTC properties into a matrix.

In addition, the particles of the ceramic filler in the matrix may have a filling level of 50% to 95%. The particles may form continuous current paths in the matrix.

A filling level of the particles of 50% to 95% in the matrix can ensure continuous current paths of the ceramic particles for current flow. Interruption of the current paths and hence of current flow through the matrix material is thus prevented. The electrical behavior of the composite material is thus determined substantially by the ceramic filler. The composite material alters its electrical resistance as a function of temperature, i.e. has an NTC or PTC characteristic, and can thus be used as a temperature sensor. The filling level of the ceramic particles in the matrix is, moreover, low enough to enable deformability of the composite material.

The filler in the composite material may comprise a material which comprises an electrically conductive spinel of the formula $A^{II}B^{III}_2O_4$ or a perovskite of the formula $ABO_3$, where A is in each case a divalent metal and B is in each case a trivalent metal. A may comprise, for example, nickel, and B, for example, manganese. In this case, the material is a ceramic material which has a negative temperature coefficient. Ceramics which have positive temperature coefficients or which have a different composition and a negative temperature coefficient can equally be used. The ceramic material may additionally also comprise dopants selected, for example, from metal oxides.

Additionally specified is a process for producing a composite material with the abovementioned properties. The process has the process steps of
A) producing the ceramic filler,
B) providing the matrix and
C) mixing the filler and the matrix.

A simple process is thus provided, with which a composite material according to the abovementioned properties can be produced.

In addition, in process step A), ceramic granules can be sintered, pressed and ground to powder. This provides a ceramic material which, in powder form, can be mixed in a simple manner with the matrix material.

In process step B), a matrix can be selected from a group comprising glass-like materials, thermoplastics, thermosets, elastomers or mixtures thereof.

In addition, in process step C), the filler and the matrix can be mixed continuously. For this purpose, the mixing can be effected, for example, on a twin-screw extruder with two co-rotating parallel conveying screws. The matrix material and the filler are continuously combined and mixed. In process step C), the filler and the matrix can also be mixed batchwise. For this purpose, the filler material or the matrix material is initially charged in a vessel, then the matrix material or the filler material is added and the materials are mixed in the vessel.

Additionally specified is a temperature sensor which has been formed from a composite material according to the above-described properties and has contacts. The temperature sensor is notable in that it is producible free of envelopes or carriers, and its outer surfaces may also be formed by composite material. The temperature sensor can detect the temperatures of adjoining bodies and/or thermal radiation. In addition, the temperature sensor formed from the composite material may be formed such that it is surface-mountable. A surface-mountable temperature sensor has good thermal and mechanical coupling of the surface area thereof onto the measurement object.

The temperature sensor may have contacts which have been applied on the surface of the temperature sensor and/or integrated into the temperature sensor. When the contacts are integrated into the temperature sensor, some of the contacts are present in the composite material, while the rest project out of the composite material and can be contacted from the outside. The contact areas between the contacts and the composite material may influence the resistance of the temperature sensor, and hence the NTC or PTC characteristic of the temperature sensor. The greater the area of the contacts which are in contact with the composite material, the lower the absolute resistance of the composite material will be. The electrical behavior of the temperature sensor can thus be adjusted as required. The electrical behavior of the temperature sensor is additionally determined by the geometric form of the composite material and by the form and the position of the contacts. This is caused by the fact that the bulk effect determines the conductivity of the temperature sensor through the entire volume of the material.

The temperature sensor may have a three-dimensional geometric form. It may be formed, for example, as a film which may be flexible. In addition, the temperature sensor may be cuboidal and/or have rounded corners. Further geometric forms, for example cylinders or irregular forms adjusted individually to the environment, are likewise producible. By virtue of the formability of the composite material, it is thus possible in a simple and inexpensive manner to produce a temperature sensor which is formed as required and is usable without additional elements, for example envelopes or carriers.

When electrically insulating surfaces of the temperature sensor are required, it is possible, for example by an additional injection molding process, to implement an optional, thermally coupled encapsulation.

Additionally specified is a process for producing a temperature sensor. The process comprises the process steps of
D) producing a composite material by the above-described process for producing the composite material,
E) forming the composite material and
F) applying contacts.

In process step D), a composite material is produced by the process mentioned above. In addition, in process step E), the composite material can be formed to a three-dimensional symmetrical form. The composite material may be formed to ribbons or films or to any further three-dimensional form. For example, it is possible for this purpose to use a method which comprises injection molding. The forming of the composite material can be performed directly after the production of the composite material in the twin-screw extruder. For this purpose, it is possible to use, for example, a slot die as the tool. The extruded ribbon can be drawn off via a smoothing calender and be formed, for example, to thin ribbons or films. In addition, a die plate may be used as the tool on the extruder. The extrudates are then processed with a suitable cutting device to give pellets, which can in turn be converted to the desired form on any desired processing machines, for example injection molding machines.

In addition, in process step F), the contacts can be applied on the surface of the formed composite material. For this purpose, it is possible to select a method selected from screen-printing, sputtering and electroplating. Process steps E) and F) can additionally be performed simultaneously, and the contacts can be integrated into the composite material. For example, an integrated contact can be produced in one injection molding which has ends which project out of the composite material and ends enclosed within the composite material.

The temperature sensor may be applied to bodies, the temperature of which is to be measured. As a result, the temperature sensor can measure the temperature over the contact area with the adjacent body. As an additional or alternative function, the temperature sensor can also be used for radiation measurement. For this purpose, a body, for example a film, may be formed, the matrix material of which has a good absorption of radiation. For this purpose, the matrix material may comprise, for example, black particles. It is thus possible to detect incident solar radiation or thermal radiation.

DETAILED DESCRIPTION OF THE DRAWINGS

Figure 1:
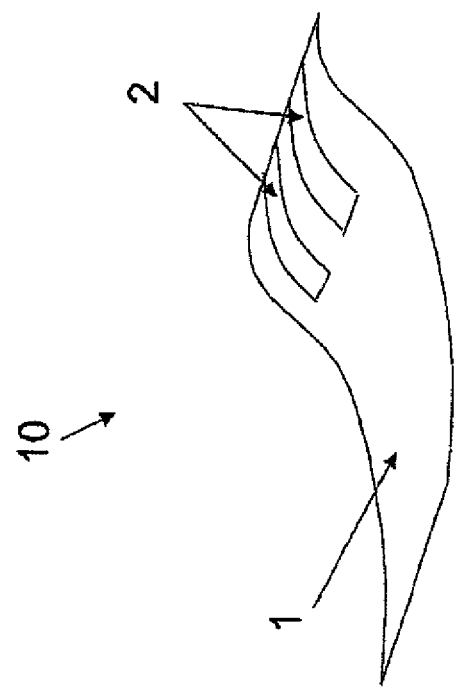
FIG. 1 shows a schematic view of one embodiment of the temperature sensor.

FIG. 1 shows a temperature sensor 10 with contacts 2, applied on the composite material 1. In this working example, the temperature sensor 10 is in the form of a film and the contacts 2 are mounted on the surface of the composite material 1. The film may be flexible and may thus be applied to any surfaces whose temperature is to be measured. The composite material may comprise a matrix material selected from glass-like materials, thermoplastic polymers, thermosets, elastomers or combinations thereof. For example, PPS or PA may be used. The matrix contains a ceramic filler which has a positive or negative temperature coefficient of electrical resistance. The filler is in particulate form in the matrix, the filling level in the matrix being sufficiently high that continuous current paths of the particles in the matrix can be formed. For example, the ceramic filler may comprise a material which comprises metal oxides, for example MnNiO, and is present in the matrix with a filling level of 50% to 95%. The contacts 2 may alternatively also be integrated into the film and have different sizes.

Figure 2:
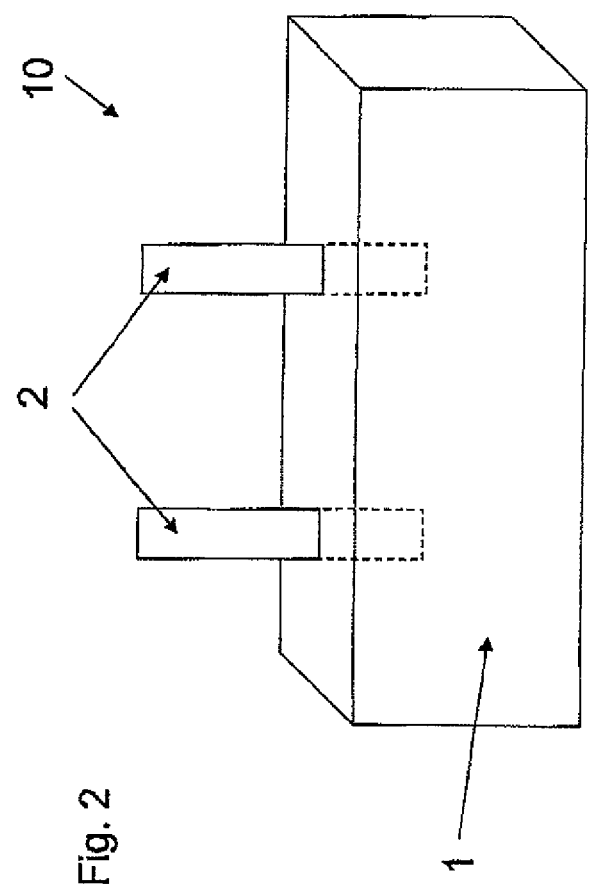
FIG. 2 shows a further schematic view of one embodiment of the temperature sensor.

FIG. 2 shows an alternative embodiment of a temperature sensor 10. The composite material 1 here is in the form of a cuboid, and the contacts 2 are integrated into the cuboid. The contacts 2 have ends which project out of the cuboid, such that they are contactable from the outside, and they have ends which are incorporated within the cuboid (indicated by broken lines). Such a temperature sensor 10 can be produced, for example, by injection molding, in which case the contacts 2 are integrated into the composite material 1 during the injection molding process. The contacts 2 could alternatively also be applied on the surface of the composite material 1 (not shown here) and have different sizes. The electrical behavior of the temperature sensor can be determined by the geometric form of the composite material 1, and by the size, form and position of the contacts 2. It is thus possible for the temperature sensor to be configured individually for the particular use with regard to its form and to its electrical behavior.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A temperature sensor comprising a composite material for temperature measurement, wherein the composite material comprises:
   a pulverulent ceramic filler comprising an electrically conductive spinel of the formula $A^{II}B^{III}_2O_4$ or perovskite of the formula $ABO_3$ where A and B are each metals; and
   a formable matrix which embeds the filler, wherein the matrix comprises a material selected from a group consisting of glass-like materials, thermoplastic thermosets, elastomers, and mixtures thereof;

wherein the ceramic filler has a positive or negative temperature coefficient of electrical resistance, and the composite material has a resistance-temperature characteristic determined by the ceramic filler, wherein the temperature sensor is in the form of a film, and wherein the film is flexible.

2. The temperature sensor as claimed in claim 1, wherein the filler is present as a multitude of particles in the matrix.

3. The temperature sensor as claimed in claim 2, wherein the particles have a filling level in the matrix of 50% to 95%.

4. The temperature sensor as claimed in claim 2, wherein the particles form continuous current paths in the matrix.

5. The temperature sensor as claimed in claim 1 having contacts.

6. The temperature sensor as claimed in claim 5, wherein the contacts are applied on the surface of the temperature sensor and/or integrated into the temperature sensor.

7. A process for producing the temperature sensor claimed in claim 1 and having contacts, comprising the steps of:
　A. producing the composite material by a process comprising the steps of:
　　i. producing the ceramic filler,
　　ii. providing the matrix, and
　　iii. mixing the filler and the matrix;
　B. forming the composite material; and
　C. applying the contacts.

8. A temperature sensor comprising a composite material for temperature measurement, the composite material comprising:
　a pulverulent ceramic filler comprising an electrically conductive spinel of the formula $A^{II}B^{III}_2O_4$ or perovskite of the formula $ABO_3$ where A and B are each metals; and
　a formable matrix which embeds the filler, wherein the matrix comprises a material selected from a group consisting of glass-like materials, thermoplastics, thermosets, elastomers, and mixtures thereof;

wherein the ceramic filler has a positive or negative temperature coefficient of electrical resistance, and the composite material has a resistance-temperature characteristic determined by the ceramic filler, wherein the filler is present as a multitude of particles in the matrix, and wherein the particles have a filling level in the matrix of 50% to 95% wherein the temperature sensor is in the form of a film, and wherein the film is flexible.

9. A process for producing a temperature sensor as claimed in claim 8, comprising the process steps of:
　A) producing the ceramic filler;
　B) providing the matrix; and
　C) mixing the filler and the matrix.

10. The temperature sensor as claimed in claim 8 and having contacts.

11. A process for producing the temperature sensor claimed in claim 8 and having contacts, comprising the steps of:
　A. producing the composite material by a process comprising the steps of:
　　i. producing the ceramic filler,
　　ii. providing the matrix, and
　　iii. mixing the filler and the matrix;
　B. forming the composite material; and
　C. applying the contacts.

* * * * *